June 2, 1970 L. BABANY 3,515,997

CIRCUIT SERVING FOR DETECTING THE SYNCHRONISM BETWEEN TWO FREQUENCIES

Filed Jan. 2, 1968 2 Sheets-Sheet 1

June 2, 1970 L. BABANY 3,515,997

CIRCUIT SERVING FOR DETECTING THE SYNCHRONISM BETWEEN TWO FREQUENCIES

Filed Jan. 2, 1968 2 Sheets-Sheet 2

United States Patent Office 3,515,997
Patented June 2, 1970

3,515,997

CIRCUIT SERVING FOR DETECTING THE SYNCHRONISM BETWEEN TWO FREQUENCIES

Lucien Babany, Le Blanc-Mesnil, France, assignor to C.I.T.-Compagnie Industrielle des Telecommunications, Paris, France, a corporation of France Filed Jan. 2, 1968, Ser. No. 695,038
Claims priority, application France, Dec. 30, 1966, 89,590
Int. Cl. H03b 3/04
U.S. Cl. 328—134 7 Claims

ABSTRACT OF THE DISCLOSURE

Logical circuit furnishing a stable logical value in case there is synchronism, and the complementary value in case there is no synchronism between two frequencies.

Figure 1:
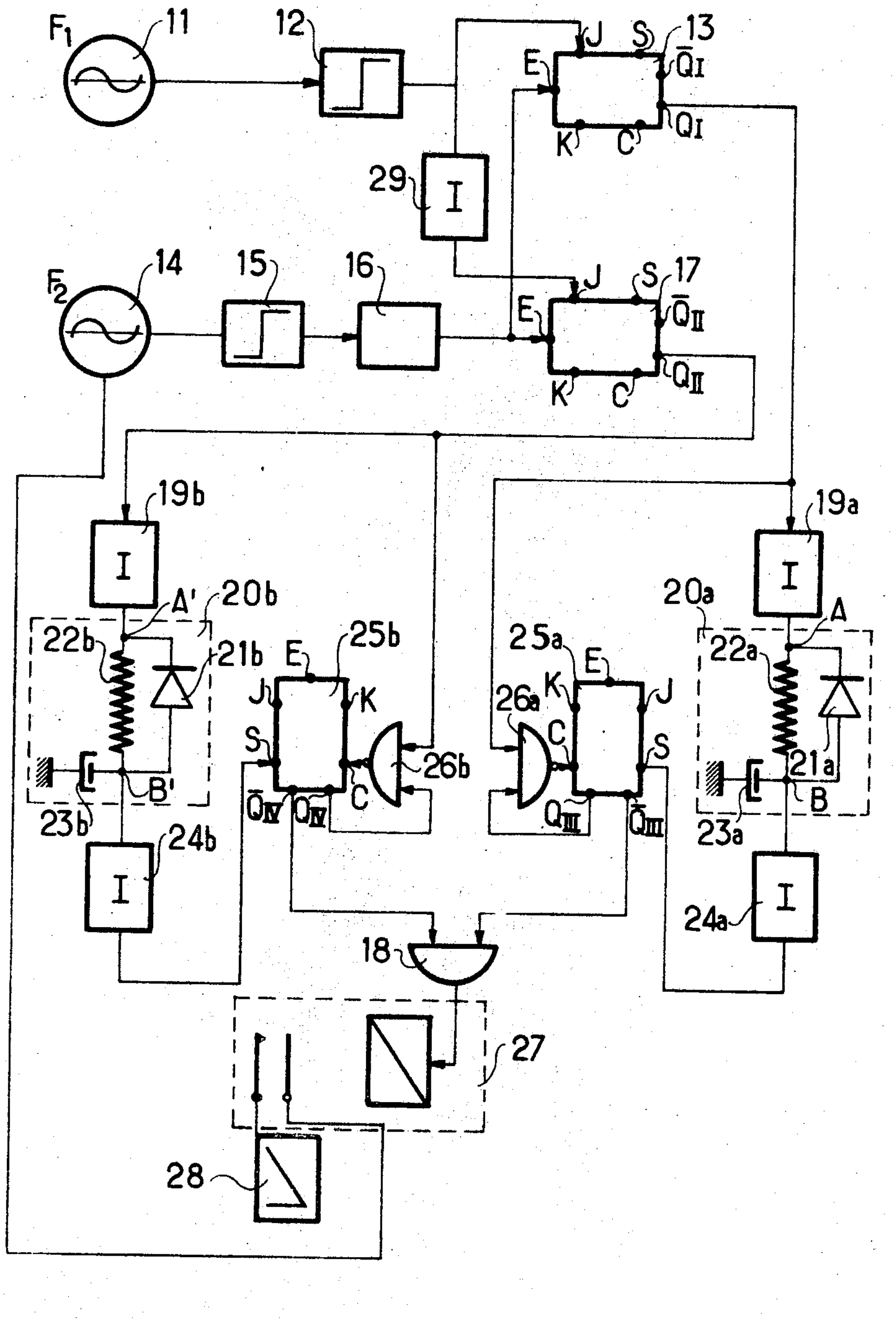

The present invention relates to a logical circuit which furnishes at one output terminal thereof a logical signal value if two given frequencies are in synchronism with respect to each other and the complementary logical signal value if the synchronism is lost. A signaling system in operative association with the aforementioned terminal may serve either for indicating the one or the other of the two conditions, or this terminal may apply to an appropriate element or member a correction signal suitable for restoring the synchronism.

The present invention is advantageously employed in or associated with a device for controlling the frequency of a variable frequency oscillator having a high stability frequency output, such as exists in frequency synthesizers. In these devices, it is conventional to search for the synchronization of a variable frequency oscillator with a predetermined high stability frequency source by means of a phase discriminator which furnishes a D.C. control voltage to a variable capacity diode being contained in the oscillator to be controlled. In a first operation of the synchronizing procedure, the frequecny of the variable oscillator must be brought into the "capture zone" of the control device by means of a frenquency-scanning process which is generally carried out by applying a saw tooth voltage to this variable capacity diode. When synchronism is achieved the D.C. control voltage is generated in the phase discriminator, is applied to the variable capacity diode to maintain synchronism and is applied also to stop the frequency scanning process.

It will be convenient to utilize the device proposed by the present invention for starting a frequency scanning operation in case of nonsynchronism, and for stopping it when synchronism is achieved or reestablished. There are known circuits which produce an analogous result, but they have an asymmetrical structure and generally employ a phase comparison between a half cycle of one of the frequencies and a half cycle of the other frequency. The circuit proposed by the present invention, on the other hand, has a symmetrical structure and uses to advantage the entire period of each frequency signal.

The present invention is based upon the principle that, if one of two frequencies $F_1$ is present as a result of a limiter circuit in the form of a rectangular wave having the two logical values "0" and "1," respectively, and if the other frequency $F_2$ appears in the form of one narrow pulse per period of the generated frequency $F_2$, there will always be present, in the case of synchronism between the frequencies, either narrow pulses aligned only on the "0" portion of the rectangular wave, or narrow pulses aligned only on the "0" portion of the complementary rectangular wave of the latter. The corresponding logical product of the narrow pulse train with the rectangular wave and complementary rectangular wave in suitable flip-flop circuits will thus always provide a zero output in the state of synchronism. In contrast thereto, if there is no synchornism between the frequencies $F_1$ and $F_2$ there results a situation where the narrow pulses do not occur regularly with the "0" portion of the rectangular wave or its complement, since the period of the variable frequency $F_2$ is either prolonged or shortened with respect to the period of the reference frequency $F_1$. As a matter of fact, a narrow pulse will cause one of the two flip-flops to actuate, and a subsequent narrow pulse because of the disparagy in the periods will cause the other flip-flop to actuate so that at a certain moment both of them will show logical "1" levels. This correspondence in level is utilized in accordance with the invention to indicate the lack of synchronism and initiate a scanning of the variable frequency oscillator until synchronism is achieved.

The present invention is advantageously carried out with the aid of bistable flip-flops having seven terminals and being equipped with a signal input E, two outputs (Q and $\overline{Q}$), two conditioning inputs (K and J) which serve for switching a pulse arriving on the input E to one of the two lines of the flip-flop, and two positioning inputs S and C which allow for putting the flip-flop into a condition which is determined by the application of adequate voltages to these positioning inputs.

According to the present invention, a device which serves for detecting the existence of synchronism between a reference frequency and a second frequency comprises means for transforming the reference frequency signal into a rectangular wave, means for transforming the signal of the second frequency into a signal providing one narrow pulse per period, a first flip-flop receiving on the input terminal thereof these narrow pulses and on the conditioning input J thereof the aforementioned rectangular wave, a second flip-flop receiving on the input terminal thereof the narrow pulses, and on the conditioning terminal J thereof the complement of the rectangular wave, and two output terminals homologous to the flip-flops and connected to two symmetrical circuits which determine the level thereof as either 1 or 0.

Figure 2:
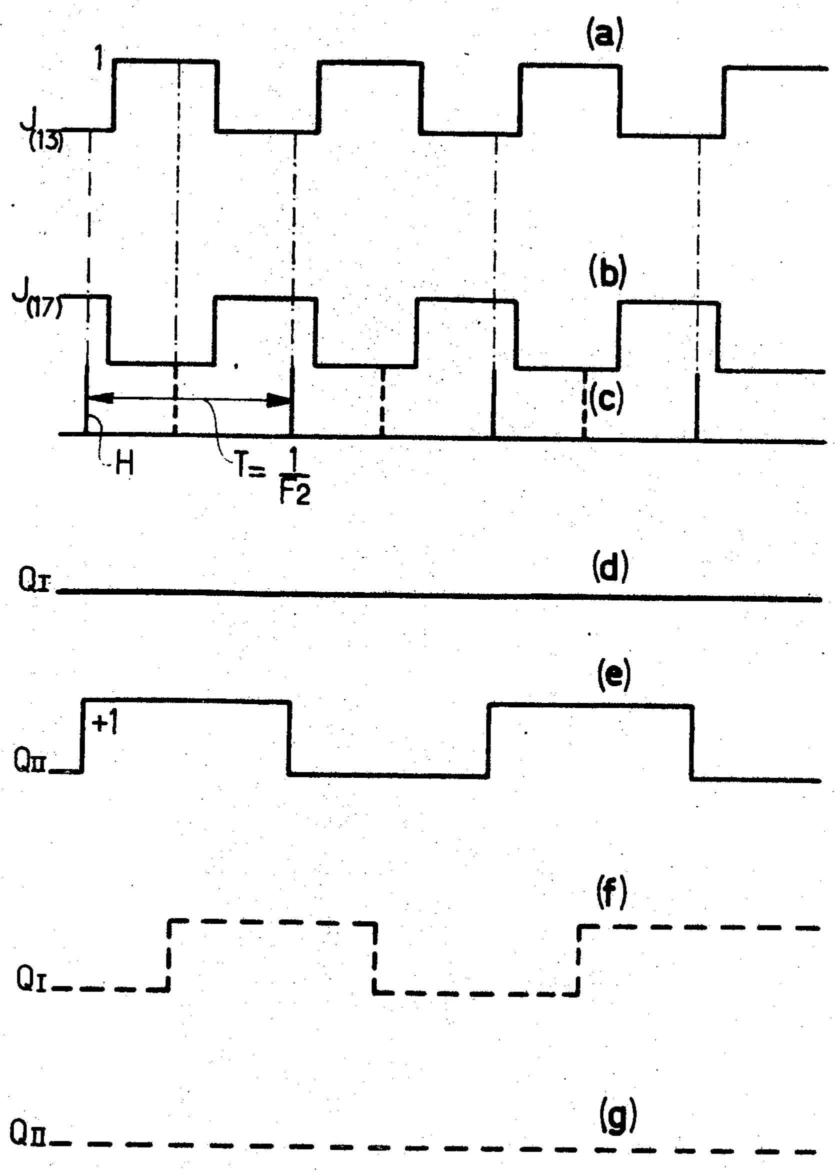

The present invention will now be described more fully hereinbelow with reference to the accompanying drawing, wherein:

FIG. 1 is a schematic block diagram of one embodiment of the present invention, and FIG. 2 illustrates a group of waveforms representing the signals at various portions of the system of FIG. 1 for purposes of aiding in the understanding of the operation of the present invention.

In FIG. 1, a fixed oscillator 11, which may be a crystal oscillator or other stable oscillator circuit, furnishes a signal of frequency $F_1$ which is applied to a limiter circuit 12 where it is converted to the form of a rectangular wave. In addition, a second variable frequency oscillator 14 furnishes a signal of frequency $F_2$ which is applied to a limiter circuit 15 where it is also converted to the form of a rectangular wave. The output of limiter circuit 15 is applied to a differentiating circuit 16 where the rectangular waveform is changed to the form of narrow regularly spaced pulses occurring once per period of the frequency $F_2$.

A bistable flip-flop 13 includes a conditioning terminal J connected to the output of the limiter circuit 12 and an input terminal E connected to the output of the differentiating circuit 16. A bistable flip-flop 17 identical to the flip-flop 13 has a conditioning terminal J connected to the output of the limiter circuit 12 by way of an inverter 29 and an input terminal E connected to the output of the differentiating circuit 16.

The output terminal $Q_I$ of the flip-flop 13 and the output terminal $Q_{II}$ of the flip-flop 17 are connected, on the one hand, to the inputs of two inverters 19*a* and 19*b* whose outputs are connected to two integrators 20*a* and 20*b*, formed respectively of a resistor 22*a* (22*b*) shunted by by a diode 21*a* (21*b*), and a condenser 23*a* (23*b*) connected between one end of the resistor 22*a* (22*b*) and ground. The integrators are followed by two further inverters 24*a* and 24*b* whose outputs are connected respectively to the positioning terminals S of flip-flops 25*a* and 25*b*. On the other hand, the terminals $Q_I$ and $Q_{II}$ of flip-flops 13 and 17, respectively, are connected to one input of the two AND gates 26*a* and 26*b*, respectively; the AND gates 26*a* and 26*b* have respective inputs connected to the outputs $Q_{III}$ and $Q_{IV}$ of the flip-flops 25*a* and 25*b* and the output of each AND gate is connected to the positioning terminal C of the corresponding flip-flop 25*a* and 25*b*.

The ouput terminals $\overline{Q}_{III}$ of flip-flop 25*a* and the output terminal $\overline{Q}_{IV}$ of flip-flop 25*b* are connected as the inputs of an AND gate 18 whose output serves, for example, for the control of a relay 27 connecting a saw tooth wave generator 28 to the variable frequency generator 14 in control of the output frequency thereof.

It is the role of the integrators 20*a* and 20*b* to maintain the excitation of the flip-flops 25*a* and 25*b* by providing a continuous signal on the positioning terminal S between pulses. The role of the inverters 19 and 24 is purely technological and non-logical, as will be seen from the following description.

In FIG. 2, waveform *a* indicates the rectangular wave arriving on the terminal J of the flip-flop 13. An impulse arriving at terminal E of the flip-flop when the signal level at terminal J is of the value 1 is transmitted as a positive level by flip-flop 13, whereas an impulse arriving in synchronism with a level of the value 0 at terminal J is not transmitted at all. Waveform *b* indicates the rectangular wave as it appears at the terminal J of the flip-flop 17 after the phase has been inverted due to the inverter 29.

Waveform *c* shows, in the state of synchronism, narrow pulses H (shown in full lines) which arrive on terminals E of flip-flops 13 and 17 from differentiating circuit 16 during the "0" levels of waveform *a* and during the "1" levels of waveform *b*. These pulses are spaced by $T=1/F_2$. The result thereof is, a waveform *d* having a zero level at the output terminal $Q_I$ of the flip-flop 13, and a waveform *e* in the form of a double period rectangular wave of positive level at the terminal $Q_{II}$ of the flip-flop 17. This is so since the flip-flop 17 then operates as a binary divider of the frequency at the input thereof.

If the narrow pulses arrive during the other half cycle of the frequency $F_1$, such as the positions shown in dashed lines in waveform *c*, the result would be a double period wave of positive level at the output $Q_I$, such as waveform *f*, and a zero level output at terminal $Q_{II}$, such as represented by waveform *g*.

Consequently, in the state of synchronism in the two cases possible, there is a zero level at the input of at least one of the inverters 19*a* and 19*b*. The zero level, which may exist at the input of the first inverter 19*a*, for example, is transformed into a positive voltage at the point A which charges the condenser 23*a* through the resistor 22*a*, the diode 21*a* being polarized inversely. Thus, at the output of the inverter 24*a* a zero level is reproduced which, applied to the positioning terminal S of the flip-flop 25*a*, furnishes a positive output level on the terminal $Q_{III}$ of this flip-flop. This positive voltage, applied to an input of the gate 26*a* maintains the gate open for a signal possibly arriving on the other input. The other elements connected to inverter 19*b* operate in an identical manner under the same conditions.

If the synchronism is lost a positive level will appear at the input of one of the inverters, for example 19*a*, which will actuate gate 26*a* already enabled by the ouput of $Q_{III}$. In addition the positive voltage at A is replaced by a zero level and the condenser 23*a* is discharged very rapidly through the diode 21*a*. There thus appears a zero level at B and a positive level at the output of the inverter 24*a* at the terminal S of the flip-flop 25*a*. The result is a zero level at the output terminal $Q_{III}$ of that flip-flop preventing further actuation thereof. The enabling of the gate 26*a*, which has already occurred however, results in switching of the flip-flop 25*a* to produce an output from terminal $\overline{Q}_{III}$.

In the absence of synchronism, positive pulses will appear at different instants at the inputs of the inverters 19*a* and 19*b*; these pulses are not transmitted to the flip-flops 25*a* and 25*b* by the gate circuits 26*a* and 26*b* since the terminal $Q_{III}$ or $Q_{IV}$ applies a zero level to the input of that gate. The zero is thus maintained permanently on the terminal $Q_{III}$ or $Q_{IV}$ for the entire time during which there is no synchronism.

If theer are simultaneously two zeroes at $Q_{III}$ and $Q_{IV}$, this is an indication that the synchronism has been lost. As is apparent from FIG. 2, since the positive level produced at the outputs $Q_I$ and $Q_{II}$ are for a double period, at any time there is lack of synchronism between the signals $F_1$ and $F_2$ there will be a positive level from both outputs $Q_I$ and $Q_{II}$ which must overlap in time even for a short period. For example, if $F_2$ were to be twice $F_1$ so that the pulses produced by differentiating circuit 16 were represented in waveform *c* of FIG. 2 by both the solid and dotted representations, it would be apparent that the outputs of the flip-flops 13 and 17 would be the waveforms *f* and *e*, respectively, which overlap in time. During this time of overlap positive levels will have been applied to both gates 26*a* and 26*b*, already enabled by the previous zero level condition, with the result that both flip-flops will be actuated.

During this time, the terminals $\overline{Q}_{III}$ and $\overline{Q}_{IV}$ are both positive the AND gate 18 will furnish under these conditions a working control signal to the relay 27, one working contact of which may actuate an indicator, or apply a saw-tooth scanning voltage, which is supplied by a generator 28, to the oscillator 14 containing a variable capacity diode (not shown) for the purpose of sweeping the output frequency of that oscillator until synchronism is achieved once again.

The advantage of the symmetrical output circuit having two flip-flops 25*a* and 25*b* consists in that, since each flip-flop serves for effectively controlling one half cycle, the synchronism is verified on both half cycles of the signals $F_1$ and $F_2$.

The afore-described embodiment of the present invention has been given by way of example only and should not be considered as a limit of the scope thereof since numerous modifications are readily possible within the framework of the present invention.

What is claimed is:

1. A system for detecting synchronism and lack of synchronism between a reference frequency signal and a controlled frequency signal comprising first means for transforming the reference frequency signal into a rectangular wave, second means for transforming said controlled frequency signal into a signal providing one narrow pulse per period of the controlled frequency signal, first logical control means connected to said first and second means for providing the logical product of said rectangular wave and said narrow pulses, second logical control means connected to said first means via an inverter circuit and to said second means for providing the logical product of the complement of the rectangular wave and said narrow pulses, and comparison means for comparing the logical product provided by said first and second logical means and providing first or second logical outputs in response thereto.

2. A system as defined in claim 1 wherein said first and second logical control means each consist of an input binary switching circuit providing first or second binary levels for the full period of said rectangular wave depending upon the logical product of the signals applied thereto.

3. A system as defined in claim 2 wherein said comparison means includes first and second output binary switching circuits connected respectively to said input binary switching circuits, and a first AND gate connected to one corresponding output of each of said first and second output binary switching circuits.

4. A system as defined in claim 3 wherein each of said first and second output binary switching circuits includes a flip-flop having at least a pair of input terminals and a pair of output terminals and an integrating circuit connecting the output of one of said input binary switching circuits to one input terminal of said flip-flop.

5. A system as defined in claim 4 wherein each of said first and second output binary switching circuits further includes a second AND gate having an output connected to the other input terminal of said flip-flop, one input of said second AND gate being connected to one output terminal of said flip-flop and another input of said second AND gate being connected to the output of said one input binary switching circuit connected to said integrating circuit, the other output terminal of said flip-flop being connected to said first AND gate.

6. A system as defined in claim 4 wherein inverter circuits are connected respectively to the input and output of said integrating circuit in each output binary switching circuit.

7. A system as defined in claim 3 wherein the output of said first AND gate is connected to control means for providing a frequency control signal in response to coincident detection of outputs from said first and second output binary switching circuits.

References Cited

UNITED STATES PATENTS

| | | | |
|---|---|---|---|
| 2,933,682 | 4/1960 | Moulton et al. | 328—133 XR |
| 3,012,200 | 12/1961 | Hurvitz | 328—134 |
| 3,205,438 | 9/1965 | Buck | 328—133 XR |
| 3,417,342 | 12/1968 | Kocher | 331—14 XR |

DONALD D. FORRER, Primary Examiner

J. ZAZWORSKY, Assistant Examiner

U.S. Cl. X.R.

307—233; 324—79, 82; 331—11, 14.